Figure 1:
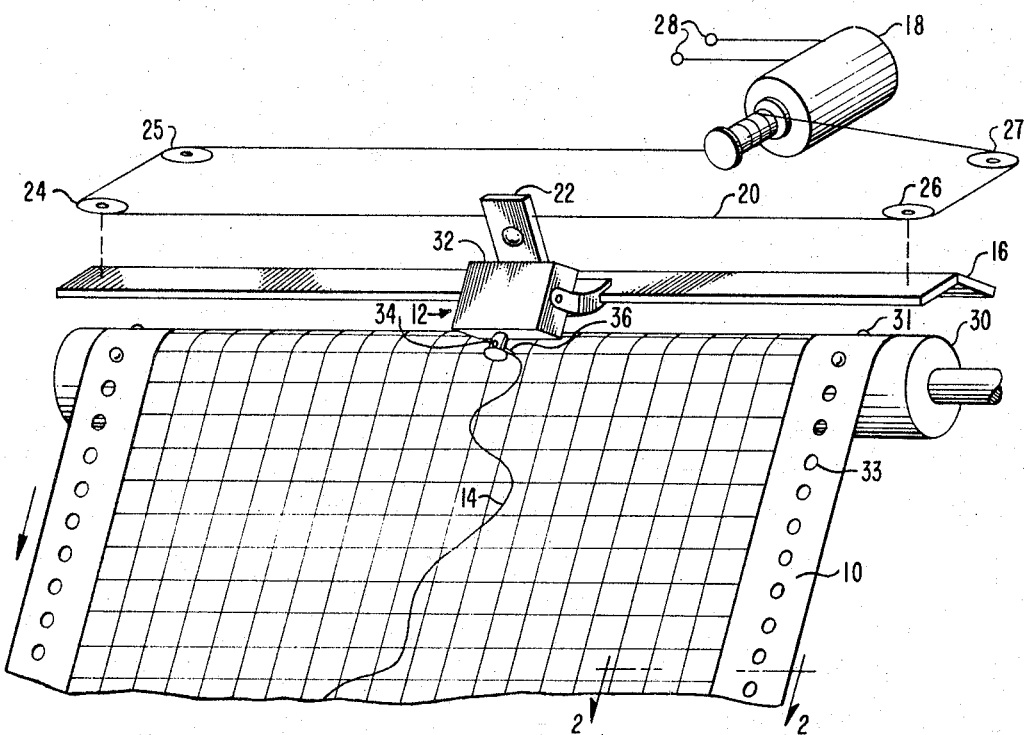

Feb. 13, 1968  K. E. SIHVONEN  3,369,253
GRAPHICAL RECORDING
Filed May 27, 1965

INVENTOR
KAUNO E. SIHVONEN
BY
ATTORNEYS

United States Patent Office 3,369,253
Patented Feb. 13, 1968

3,369,253
GRAPHICAL RECORDING
Kauno E. Sihvonen, Arcadia, Calif., assignor to Neff Instrument Corporation, a corporation of California
Filed May 27, 1965, Ser. No. 459,353
21 Claims. (Cl. 346—76)

The present invention generally relates to improvements in graphical recording and more particularly relates to improvements in graphical recording media and in systems employing heated ink compositions and in methods of employing the graphical recording systems.

It is well known to provide a visual record of the relationship between at least one variable and time or between two or more variables by graphically reproducing a trace upon the surface of a graphical recording medium, such as a moving sheet of chart paper, in accordance with changes in the variable or variables to be recorded. The production of such visible traces can be accomplished by means of conventional graphical recorders which include servo mechanisms responsive to electrical signals for positioning a marking pen with respect to the surface of a record sheet or other graphical recording medium.

However, in conventional recording arrangements the marking means, including the marking pen and the ink used in the pen, produce somewhat unsatisfactory results. In this regard, conventional inks employed in graphical recording systems usually contain relatively high concentrations of water. Such aqueous inks tend to soften the surface of conventional fibrous recording media with which they come into contact. Such softening is usually more pronounced when the recorder pen is allowed to rest on the surface of the recording medium for any length of time. This is also the case when the recorder pen traces lines which are relatively closely spaced apart.

When the fibers at the surface of the recording medium soften during contact with the aqueous ink they become more moisture-absorbent and more easily subject to mechanical damage. Blobbing of the ink by reason of withdrawal of excessive quantities of ink from the recording pen into the wetted surface areas may occur, resulting in blurring and running together of closely spaced trace lines. Moreover, the continuity of the softened surface of the recording medium may be disrupted, particularly if the recorder pen is in direct frictional contact therewith. Moreover, aqueous inks used in graphical recording systems dry relatively slowly and, therefore, excessive care must be exercised in handling the graphical recording medium, after the trace has been applied thereto, in order to avoid smearing and/or destruction of the trace. It has also been found that when ballpoint pens utilizing various inks are employed in graphical recording systems, the pens have a tendency to skip, that is, to fail at certain speeds of travel to apply a continuous trace to the surface of the recording medium.

The indicated failings of conventional recording systems have been overcome through the use of an improved graphical recording system employing a heated ink composition, which system is more fully described in co-pending United States application, Ser. No. 217,891 of Kauno E. Sihvonen, filed Aug. 20, 1962, now Pat. No. 3,247,519 for Improvements in Graphical Recording Systems, said application having been assigned to the assignee of the present application.

In the described co-pending application, a graphical recording system is set forth which utilizes an improved wax-containing ink which has a relatively sharply defined initial softening point above ambient temperature. Means are provided for maintaining such ink in a heated fluidized condition within the graphical recording system and for depositing the ink in the fluid state as a smooth continuous trace upon the surface of a recording medium to represent a variable to be recorded. The temperature of the ink is controlled with respect to that of the surface of the recording medium by suitable means so that when the ink is transferred to the recording medium as a trace it solidifies rapidly to form a permanent non-smearable record. Application of the ink to the recording medium and drying of the ink thereon are efficiently accomplished without any deterioration of the surface of the recording medium.

The improved ink disclosed in the indicated co-pending patent application is normally solid (at ambient temperature) and usually is non-aqueous. It may, for example, comprise a mixture of chlorinated naphthalene waxes having selected properties in which is dissolved selected organic dye. The diameter of the pen opening through which the ink is discharged is selected with respect to the natural surface tension of the fluidized ink so that the ink does not readily flow therefrom until such surface tension is broken by physically contacting the bead of ink at the end of the opening with the adjacent surface of the recording medium. Accordingly, dripping of ink from the pen is avoided. However, during recording, the ink smoothly flows from the pen and provides a cushion or film between the adjacent surfaces of the pen and recording medium so that the pen does not drag or skip on the such surface but moves smoothly thereover, providing a continuous trace. The temperature of the ink, as previously indicated, with respect to the surface of the recording medium is controlled so that solidification of the ink substantially initially takes place upon deposition on the surface of the recording medium. No wetting, softening, soaking, surface disrupting or other deterioration of the surface of the recording medium occurs during or as a result of the recording procedure.

It has been found that such an improved graphical recording system as described in the indicated co-pending patent application has an inherent full scale accuracy with respect to the trace applied to the chart paper or other graphical recording medium of about plus or minus 0.1%. This inherent accuracy is extremely high and is particularly beneficial in accurately producing traces for measurement of physical criteria. However, it has been further found that the conventional chart paper or graphical recording medium utilized in conventional graphical recording systems has a total linear expansion of approximately 1% over a range of humidity of between 20% and 80% relative humidity. Accordingly, the improved graphical recording system described in the indicated co-pending patent application has a much higher inherent scale accuracy with respect to the trace than the conventional chart paper recording medium can provide. The net effect is that although the trace is put upon the recording medium with an accuracy of plus or minus 0.1%, a substantial fluctuation in the relative humidity of the chart paper can substantially enlarge the inaccuracy of the trace and thereby overcome some of the advantages inherent in the improved graphical recording system. Thus, conventional chart paper is usually of a cellulosic nature comprising felted or interleaved wood pulp fibers and is highly sensitive to humidity, readily absorbing water. As previously described, conventional recording media are especially subject to wetting and tearing, and also blurring and running of the trace, as well as the described substantial fluctuations in dimensions under varying humidity conditions.

Accordingly, in order to take full advantages of the inherent high scale accuracy afforded by such improved graphical recording systems as that set forth in the indicated co-pending patent application, it would be desirable to provide an improved graphical recording medium and method of use thereof. For example, an improved chart paper having much lower total linear expansion and contraction than conventional chart paper over a wide range of relative humidity would be highly desirable. It would also be advantageous to be able to employ such improved paper in an improved manner in a graphical recording system of inherently great accuracy utilizing selected heated ink.

Accordingly, it is a principal object of the present invention to provide an improved graphical recording medium.

It is also an object of the present invention to provide an improved graphical recording system employing a graphical recording medium having increased dimensional stability, and adapted for use with a selected heated ink in the system.

It is a further object of the present invention to provide an improved method of graphically recording a trace, particularly with greater accuracy and dimensional stability.

It is a still further object of the present invention to provide an improved graphical recording system employing heated non-aqueous ink traces and graphically recording media substantially insensitive to humidity fluctuations.

It is yet another object of the present invention to provide an improved method of graphically recording traces which method employs non-aqueous heated ink and improved dimensionally stable, humidity-insensitive recording media.

The foregoing objects of the present invention and other objects are accomplished by providing in a hot non-aqueous ink graphical recording system an improved graphical recording medium particularly adapted for use with the heated ink and inherently of greater dimensional stability than conventional recording media. The medium employs a smooth moisture proof, flexible surface containing material selected from the group consisting of selected wax, synthetic thermoplastic resin and mixtures thereof. The coating has an initial softening point of at least about that of the ink and is in all respects compatible therewith. The medium includes indicia for graphical recording and also includes apertures along the sides thereof by means of which the medium is releasably secured to in the recording system. The surface of the recording medium has a linear dimensional change of substantially less than the conventional 1% and usually not more than about 0.5% when subjected to a wide range of relative humidities of between about 20% and about 80%. Moreover, the improved surface of the medium has excellent writing properties, in that it is unusually even and smooth. It contributes to rapid solidification of the ink trace thereon. There is no blurring or marring of the heated non-aqueous ink trace after its application to the surface of the medium. It will be noted that the medium includes a surface having the desired properties and a substrate connected thereto. The substrate may be separate and distinct in properties from the surface. The desired surface may be on only the trace-receiving side of the medium or also on the opposite side thereof. In one aspect of the invention the substrate and surface have the same properties, i.e. a sheet of material of uniform composition throughout is utilized. Furthermore, the improved graphical recording medium is inexpensive, attractive and relatively convenient to use.

The method of the present invention includes graphically recording a trace upon a recording medium in response to at least one variable by first fluidizing a normally solid non-aqueous ink and thereafter passing the heated ink into contact with the surface of a graphical recording medium, said surface having the characteristics previously described. The temperature of the ink is controlled during the contact such that the ink readily and rapidly solidifies on the surface of said recording medium to provide the permanent trace.

Figure 2:
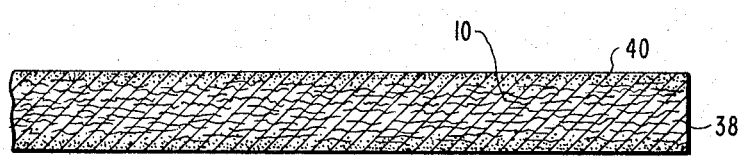

A better understanding of the invention may be had from a study of the following detailed description and the accompanying drawings, of which:

FIG. 1 is a diagrammatic illustration of one embodiment of the graphical recording system of the invention employing heated non-aqueous ink and an improved dimensionally stable graphical recording medium; and FIG. 2 is an enlarged fragmentary section of one embodiment of the graphical recording medium, taken along the section line 2—2 of FIG. 1.

Now referring more particularly to the accompanying drawings, FIG. 1 of the drawings illustrates a graphical recording system in simplified form incorporating an improved inking arrangement. In the graphical recorder of FIG. 1, an improved recording medium in the form of a strip of lined chart paper 10 containing suitable chart indicia is transported relative to a pen carrier 12 which carries a hot ink for recording a variable in the form of a visible trace 14 on the chart paper 10. The pen carrier 12 is suspended from a support guide rail 16 extending generally transversely of the direction of movement of the chart paper 10 and is linked to a servo motor 18 via a drive cable 20 fastened to an upstanding member 22 on the pen carrier 12 and strung around pairs of idler pulleys 24 and 25 and 26 and 27 positioned adjacent the ends of the rail 16.

During operation of the recording system, signals corresponding to a variable to be recorded are applied to the terminals 28 to energize the servo motor 18 whereby the pen carrier 12 is continuously repositioned transversely of the chart paper 10. A roller 30 containing teeth 31 engages apertures 33 adjacent the edges of the chart paper 10 and provides a chart paper bed beneath the pen carrier 12. As the chart paper 10 is transported there may be drawn in ink thereon a curve or trace 14 corresponding to the variations in the signal applied to the terminals 28.

The pen carrier 12 includes an upper reservoir 32 in which normally solid ink is fluidized, as by heating elements (not shown), and an ink conduit 34 connected at one end to the lower end of the reservoir 32 and serving as a second smaller ink reservoir. The conduit 34 terminates at the opposite end a smaller diameter tube of pen tip 36 adapted to deliver the fluidized ink to the surface of the recording medium 10 for production of the trace 14, as shown in FIG. 1. Further details of the physical components of the system, exclusive of the composition of the recording medium and of the ink are set forth in the previously indicated copending patent application.

It will be appreciated that the diagrammatic illustration of FIG. 1 has been simplified in order to more clearly set forth the graphical recording system and that in a given recording system conventional servo systems including null balancing circuits, electrical signal amplifiers and the like (not shown) may be included for suitably energizing the servo motor 18 to cause the pen carrier 12 to seek an appropriate position with reference to the chart paper 10 corresponding to the value of the variable being recorded. Moreover, the various elements illustrated are supported by conventional framing members and a transport system is linked to the chart 10 for effecting a suitable movement of the chart paper with reference to the pen carrier 12. Since servo systems, framing members and chart paper transport arrangements are well known and appear in conventional graphical recorders, they are not illustrated in the accompanying drawings and detailed description thereof is not given herein.

The non-aqueous ink utilized in the described graphical recording system is normally solid, that is, has an initial flow point above ambient temperature, and contains material selected from the group consisting of synthetic thermoplastic resin, wax and mixtures thereof. The ink may also contain a dye. The ink is utilized in the heated liquefied condition, that is, fluidized for production of a trace. Additional optional constituents of the ink may comprise odor-imparting or odor-making compounds, extenders, and the like.

The wax which may be utilized in the ink comprises one or a plurality of selected waxes which are normally solid at ambient temperature, but which are liquid at the desired operating temperature for the graphical recording system, for example at about 275° F. It is preferred that the wax remain a solid at temperatures up to at least 120° F. so that the permanent ink trace applied to the improved recording medium of the present invention will not melt during normal usage and storage of the traced recording medium. It is even more preferred that the wax remain in the solid form up to temperature of about 150° F. or more. It is also preferred that the wax have a relatively sharply defined or narrow melting point range, preferably a substantially single melting point so that accurate control over the degree and extent of solidification with respect to temperature for the ink can be effected during use thereof for trace production. Substantially identical melting and softening points for the wax are highly desirable so that softening of the wax does not occur substantially before fluidizing the same.

It is important that the wax of the ink have a sufficiently low viscosity so that it flows smoothly and readily. For example, a viscosity of not more than about 40 Saybolt seconds at a temperature of, for example, about 50–100° F. above its melting point, is desirable. The ink containing the wax, however, should have a surface tension sufficiently high so that the ink does not drip from the ink-delivering tip of the pen. It is also preferred that the ink upon evaporation thereof not leave any substantial residue behind which would tend to clog the components of the recording system. Furthermore, in order to assure safety in use, the wax of the ink should have a relatively high flash point and fire point. The wax is selected such that selected organic dyes can be substantially completely dissolved therein without difficulty.

It has been found that preferred waxes for use in the non-aqueous ink of the recording system comprise selected halogenated hydrocarbons, particularly synthetic waxes of the chlorinated naphthalene type. Certain of these synthetic waxes have viscosities in the liquid condition of not more than 35 Saybolt seconds. An example of a particularly preferred wax of this type is commercially sold under the registered U.S. trademark Halowax by Koppers Company, Inc., Pittsburgh, Pa. and is identified as product number 1001. Halowax 1001 comprises a mixture of trichloronaphthalenes and tetrachloronaphthalenes having an over-all chlorine saturation of about 50%, a melting point of about 190° F., an identical softening point, a flash point of about 285° F. and a boiling point in excess of 300° F. The Saybolt viscosity thereof is 30 at 266° F. Such a mixture of waxes completely dissolves certain organic dyes suitable for coloring the wax. The wax and the wax-containing ink made therefrom have no adverse effects on the selected graphical recording media utilized in the present invention. Moreover, they flow smothly, dry rather rapidly, do not run on the surface of the recording medium and are capable of efficiently forming traces during use of the improved graphical recording system at high, low and intermediate speeds.

A second suitable chlorinated hydrocarbon wax is commercially known as Halowax 1099. Halowax 1099 comprises a mixture of trichloronaphthalenes and tetrachloronaphthalenes having an approximate chlorine concentration of about 52% of saturation a melting point of about 215° F., a flash point of about 285° F. and a boiling point in excess of 300° F. As with Halowax 1001, there is no fire point up to the boiling point of the wax mixture. The viscosity of Halowax 1099 is 31 Saybolt seconds at 266° F.

Chlorinated naphthalenes and mixtures thereof such as the Halowaxes can be prepared in a number of ways, including the chlorination of naphthalene in the presence of iron, iron chloride, iodine or other suitable catalyst. In one particular procedure, naphthalene is treated with chlorine and 0.5% ferric chloride catalyst, then neutralized with caustic soda. The degree of chlorination of the naphthalene depends on how long the procedure is carried out, the relative concentration of constituents, the operating conditions and other factors.

It will be understood that ink suitable for use in the present graphical recording system can also be prepared utilizing other waxes in place of or in addition to the described synthetic halogenated hydrocarbon waxes. In this regard, paraffin waxes have been used. Moreover, certain of other petroleum-derived waxes such as the microcrystalline waxes can be used in mixtures with certain vegetable waxes. However, with waxes other than the described halogenated hydrocarbon waxes it is difficult to obtain all desired ink characteristics, including the described sharply defined melting points and substantially identical softening points.

It will be further understood that the ink can employ one or more of synthetic thermoplastic resins alone or in mixture with each other and/or the previously described waxes. Preferably, the resins are selected to provide or preserve essentially the same characteristics in the ink as described regarding the waxes, i.e. Saybolt viscosities in the liquid state of the order of, for example, not more than about 40 seconds, controlled and relatively sharply defined melting and softening points, etc. Typical synthetic thermoplastic resins which can meet these specifications include polyethylene, polyvinyl chloride and polystryrene resins, the extent of polymerization to a large degree controlling the viscosity and other characteristics of the resin. As a specific example, Epolene 3–14, a U.S. registered trademark of Eastman Chemical Products, Inc., 260 Madison Avenue, New York 16, New York, has been substituted for wax in the ink. Epolene 3–14 is low molecular weight (approximately 1400 average) polyethylene resin with a softening point of 101° C., a penetration hardness of 3.5, Brookfield viscosity at 125° C. of 190 cps. and Gardner color of 2.

Moreover, Epolene 3–14 has been substituted for a portion of Halowax 1001 in a typical ink formulation, as follows: Epolene 3–14—10 percent, by weight, Halowax 1001—89.7 percent by weight, and organic dye (toluidine red) 0.3 percent, by weight. Moreover, other low molecular weight polyethylenes sold under the U.S. registered trademark Epolene by the aforesaid company and having softening points of 100° C.–114° C., Brookfield viscosities of 340+ cps. at 120° C. and Gardner colors of 2 maximum are utilized in place of or in addition to wax in the ink formulations. So also are polyvinyl chloride resins and low molecular weight polystyrene resins, among others. Accordingly, the ink may contain wax and/or synthetic resin.

The dye utilized in the ink is in a minor concentration with respect to the wax or resin, usually from about 0.1% to about 8.0% by weight of the ink, preferably about 0.4% by weight. The dye must, of course, be substantially completely soluble and re-soluble in the wax or resin when the latter is in liquid form. Moreover, the dye should be heat stable up to and including the contemplated operating temperature of the recording system, and preferably should not leave a substantially great residue upon evaporation. Suitable wax-soluble and synthetic thermoplastic resin-soluble organic dyes are commercially available, some of which are light resistant and heat stable up to 300° F. or more. Thus, para reds, toluidine reds, benzidine yellows and similar dyes can be utilized in the ink. Toluidine red can, for example, be prepared by diazotizing 2-nitro-p-toluidine and coupling the product with alkaline 2-naphthol. Toners such as Victoria blue, methyl violet, brilliant green and the like are also suitable and usually can be prepared by reacting the basic dyestuff with a suitable reagent such as phosphotungstic acid to provide the desired dye. For example, one particularly suitable wax-soluble dye is prepared from a basic dyestuff of the triphenyl methane type having the formula $C_{33}H_{32}N_3Cl$. The dyestuff is converted to a toner through the use of phosphotungstic acid reagent and is known as Victoria blue. A substantially similar product is known as Victoria pure blue, and is commercially available from Dye Specialties, Inc. Victoria blue is light resistant and withstands baking at 270° F. for 20 minutes without discoloration.

The dyestuff may also comprise other selected dyes of the modified anthroquinone type, modified phthalocyanine type and other types.

It should be understood that the particular organic dye selected will largely depend upon the color desired in the ink, the particular wax or wax mixture or the thermoplastic resin or resin mixture or resin-wax mixtures utilized in the ink, the heat stability desired for the dye and the solubility of the dye in the wax or resin. For example, both Halowax 1001 and Halowax 1099 can be separately successfully utilized with Victoria blue in ink carrying concentrations of the dissolved dye between about 0.1% and 1.0%, by weight, with the preferred concentration of the dissolved dye being about 0.4%, by weight of the ink. In the above-indicated specific formulations the wax constitutes the remainder of the ink. The indicated dye can also be successfully utilized at 0.4% by weight concentration dissolved in paraffin wax having a melting point of, for example, between about 122° and about 124° F., the wax also constituting the remainder of each formulation. However, it will be understood that other wax-containing and/or synthetic thermoplastic resin-containing non-aqueous heated ink suitable for graphical recording apparatus identical to or substantially different from that illustrated in FIG. 1 can be utilized in the present system and method. Thus, the method of the present invention is directed to steps employing heated non-aqueous inks in graphical recording, the inks meeting the above description. In accordance with the method, the ink is delivered in a heated fluidized condition and is applied as a trace to an improved graphical recording medium in accordance with the invention. The trace becomes permanent upon cooling of the ink to below the solidification point thereof, particularly below the solidification point of the wax and/or synthetic plastic resin base of the ink.

Now referring to FIG. 2 of the accompanying drawings, the improved graphical recording medium of the present invention is schematically illustrated. It comprises the sheet 10 of chart paper having a substrate 38 and a recording surface 40 integral with the substrate 38. The substrate 38 may be any suitable graphical recording medium, for example, paper, plastic, metal or the like of extended surface area and of sufficient strength and flexibility to be utilized for the intended purposes as chart paper or other graphical recording medium. Such substrate carries graphical recording indicia, e.g. lines, etc. and the sides or ends thereof are provided with means for releasably securing the medium in the graphical recording systems. Such means may be a series of spaced apertures 33 adjacent opposite sides of the medium.

The surface 40 of the graphical recording medium which receives the trace of non-aqueous ink from the pen is very carefully selected so that it is essentially even, smooth, compatible with the ink and moistureproof. Such moistureproof surface effectively protects the substrate of the recording medium from substantial linear change when subjected to varying degrees of humidity. Accordingly, the inherent full scale accuracy of the hot non-aqueous ink graphical recording system is substantially preserved. Since the surface of the recording medium is relatively smooth and even, it allows the trace of ink to be accurately applied thereto. The material in the surface of the recording medium is selected so that its softening and melting points are sufficiently high so that the non-aqueous ink trace when applied thereto does not spread by substantial melting of areas of the surface other than possibly those areas directly under the ink trace; the trace remains with the same dimensions as when initially applied to such surface. It is necessary that the initial softening point of the surface of the recording medium be high enough so that as the hot fluidized ink comes into contact therewith, such surface offers sufficient resistance for the ink to be pulled easily from the pen tip and flow smoothly on the surface. If, such surface were to have an initial softening point sufficiently low so that it softened and/or melted well in advance of the ink trace, this would tend to minimize frictional resistance of the surface and thereby tend to slow the flow of ink from the recording pen. It would also distort the trace, allowing it to spread out in the melted surface so that, in effect, a suitable trace could not be produced on such surface of the recording medium. Accordingly, the selection of the surface for the recording medium must be carefully made in accordance with the contemplated temperature of the fluidized ink in the recording system, and the nature and type of the wax or synthetic thermoplastic resin of the ink. It is preferred that the material used at the surface of the recording medium have a single softening and melting point. In any event, its initial softening point, whether single or composite, must be at least about as high as that of the recording ink. It should be clearly understood that when the substrate is porous and of a substance other than the material used at the surface of the recording medium to control the characteristics thereof and render the same moistureproof, etc., such surface material is ordinarily used only to fill the pores of the substrate substance at such surface so that, in effect, the finished surface includes both the filling material and the filled substrate substance. However, in order to simplify the explanation herein, reference is usually made only to the filling material when the surface is described. It will be understood that such surface can include filled material. It is also contemplated to utilize the filling material as a very thin (of the order of a few mils or the like) top coating over the substrate. In such instances the recording surface comprises only the filling material. It is further contemplated to utilize the substrate material as the top surface material, e.g., polyethylene film. In such instances the substrate and surface are substantially identical.

It has been found that for the purposes of the present invention, the surface 40 of the recording medium must comprise material selected from the group consisting wax, synthetic thermoplastic resin, and mixtures thereof compatible with the ink. The surface must be essentially smooth, even and moistureproof, yet readily strip the ink from the pen and allow it to dry rapidly into a dimensionally stable and accurate trace. Thus, any suitable wax or mixture of waxes selected in accordance with the foregoing criteria can be used. For example, in one preferred embodiment the surface of the recording medium comprises, in effect, a wax ink which is to be utilized in the recording system, but without the organic dye which is present in the ink. Thus, for example, a conventional lined chart paper containing apertures along the side thereof and identified as Gubelman GH–13, well-known in the graphical recording industry, such paper exhibiting a typical linear dimensional change of about 1% over a range of 20–80% relative humidity, is treated with fluidized Halowax 1001. The paper is immersed in the molten wax, then withdrawn and the Halowax 1001 is allowed to cool to a hardened flexible state, after which the composite product is ready for use as an improved graphical recording chart paper of the present invention. The Halowax 1001 is found to have saturated the paper, filling the pores thereof. However, there is no perceptible top coating on the recording surface. The wax can also be, if desired, applied to such surface after dissolving the wax in a suitable solvent, for example trichlorethylene. It will be understood that the wax or wax dissolved in a solvent can be painted, sprayed or otherwise applied to the paper in place of immersing the paper therein. It will be further understood that essentially identical methods of application can be used in treating the substrate with synthetic thermoplastic resin or a mixture thereof with wax.

It has been found that after such treatment the dimensional changes due to relative humidity in the range of 20–80% relative humidity are reduced from 1.0% (for graph paper and the like) to about 0.5%. In the case where GH–13 paper is saturated in molten Halowax 1001, then drained and the wax is allowed to solidify therein, the dimensional changes in the paper due to relative humidity changes of from 20–80% relative humidity are reduced to about 0.4%. Comparable reductions in dimensional changes due to relative humidity fluctuations can be observed when paper identical with commercial breakfast food wrappers, and comprising cellulosic paper saturated with a suitable plastic or plastic-wax mixture, for example, polyethylene or polyethylene-paraffin mixture, is utilized in place of conventional chart paper. Furthermore, it has been found that when a polyethylene-saturated high quality paper is subjected to fluctuations in humidity, it may exhibit dimensional changes during a change in humidity from 20–80% of as low as about 0.2%. Polyethylene films, polyvinyl chloride films, polystyrene films, polyethylene terephthalate (Mylar) films and similar synthetic thermoplastic resin films have been found to be suitable for the recording medium, both substrate and recording surface.

In most instances, the surfaces of such films are "frosted" or otherwise provided with sufficient frictional resistance with respect to the ink to avoid difficulties in removing the ink rapidly from the pen tip during trace production. "Frosting" can be accomplished by partially dissolving the surface of the film and allowing it to reset, or by casting the film against a surface containing minute irregularities, etc. Such procedures are well-known in the plastic film-forming art.

The following example further illustrates certain features of the present invention:

EXAMPLE

In a first series of tests, non-aqueous ink was formed by mixing together approximately 99.5 parts by weight of Halowax 1001 and approximately 0.5 part by weight of Victoria blue organic dye while the wax was at above 250° F. The dye was uniformly distributed and dissolved in the liquid wax. The resulting solution was then filtered through a bronze filter having a port diameter of about 100 microns, after which the solution was heated to above 300° F. for about five minutes, then poured into a ceramic mold and cooled to solid form. The solid molded ink piece was hard, easy to handle and store and had a melting point of about 190° F. and a flash point of about 285° F. The dye remained uniformly distributed in the ink and, upon remelting of the ink piece, the dye remained completely dissolved in the wax and uniformly distributed therein.

In the same series of tests, one sample of commercial chart paper comprising cellulosic fiber was totally immersed in a vat containing molten Halowax 1001, then removed and the wax was allowed to drain from all surfaces thereof and solidify therein. Before such immersion the chart paper had a linear dimensional change of about 1% over a range of 20–80% relative humidity. After the immersion, the chart paper had a linear dimensional change of only about 0.4% over a range of 20–80% relative humidity. A second sample of the chart paper was immersed in a 20%, by weight, solution of Halowax 1001 in trichlorethylene, then removed and dried. The treated paper exhibited a reduction in dimensional change comparable to the sample immersed in the molten wax.

The above-described ink was fluidized at about 275° F. and was passed to the surface of both samples of the Halowax-treated chart paper in parallel runs in the graphical recording system illustrated in the accompanying drawings and previously described. In each instance, the ink flowed smoothly onto the surface of the recording medium and dried rapidly thereon, permanently bonded to the surface without running and without spreading. No dragging or skipping of the trace of the ink upon the recording medium was observed. The surface tension characteristics of the liquid ink were such that the ink did not drip from the small diameter pen conduit. Moreover, the ink formed a cushion upon which the recording pen point smoothly rode during trace production. Since the ink had a relatively high flash point and fire point and since the surface of the recording medium comprised the wax of the ink, fire hazards during use of the ink and during operation of the recording system were minimized. In each instance the inherent full scale accuracy of about 0.1% of the recording system was only increased slightly due to the very slightly greater linear dimensional instability of the treated paper, i.e., 0.4%. Accordingly, the recording accuracy of the system was substantially retained and represented a substantial improvement over conventional systems. Since the ink trace dried very rapidly, the recording medium (paper) was wound up substantially immediately after use without blurring of the trace or printing off of the trace on adjoining portions of the wound recording medium.

In a second series of parallel tests conducted in the manner described for the first series, paraffin-saturated paper was substituted for the Halowax 1001-treated chart paper. It was found that the paraffin-treated paper was unsatisfactory, inasmuch as the melting point of the paraffin was substantially below that of the Halowax ink. The net result was that the paraffin on the surface of the recording medium melted well in advance of the trace, causing the trace to run and spread, and making it difficult to pull the tracing ink from the pen tip, due to low frictional resistance of the melted paraffin.

In a third series of parallel tests, Halowax 1099, previously described, was substituted in the recording medium for the Halowax 1001, with comparable results.

In a fourth series of parallel tests, polyethylene-saturated cellulosic paper was utilized as the recording medium. The dimensional stability was increased to a low value of 0.2% over a 20–80% relative humidity range. Results otherwise comparable to those of the first series of runs were obtained.

In a fifth series of parallel tests, Epolene 3–14 polyethylene was mixed with a 200° F. melting point chlorinated hydrocarbon wax in a weight ratio of 1:9 and then the mixture was heated to above the composite melting point and utilized to saturate chart paper. Results comparable to those of the first series of tests were obtained.

In a sixth parallel series of tests, low molecular weight polystyrene was substituted for the polyethylene of the fifth series in a group of runs, and in another group of runs, Mylar (polyethylene terephthalate) film was used as the entire recording medium. In still another group of runs, "frosted" polyethylene film was used as the recording medium, and in a further group of runs "frosted" polyvinyl chloride was used as the recording medium. All runs yielded satisfactory results substantially similar to those of the first series of runs.

In a final parallel series of runs, the test conditions of the first six series of runs were duplicated, except that the material of the ink composition, exclusive of the dye, was varied in the following manner:

Group A—Halowax 1099 (100% by weight).
Group B—Halowax 1001 (90% by weight), and Epolene 3–14 (10% by weight).
Group C—Epolene 3–14 (100% by weight).
Group D—paraffin wax (100% by weight).
Group E—polyethylene (100% by weight).
Group F—microcrystalline wax (10% by weight), and Halowax 1001 (90% by weight).

The inks of all the groups were suitable for use with all the described recording media, except the paraffin-saturated paper recording media. However, the ink of Group D was suitable even for that purpose. The results obtained were satisfactory and comparable to those obtained in the previous series of tests (exclusive of the second series).

Accordingly, the above tests clearly demonstrate the advantages of the present recording media, method of graphical recording and graphical recording system over conventional recording media, and methods and systems of graphically recording.

It will be appreciated that other modifications, variations and alternative forms of the invention are within the scope of the invention as such and the invention is not to be limited by the foregoing description but is to be taken to include all alternative arrangements, modifications or equivalents falling within the scope of the appended claims.

What is claimed is:

1. In a graphical recording system for producing a trace representing at least one variable on a recording medium, wherein the system comprises, in combination, a recording medium, a pen adapted to produce a trace on the surface of the recording medium, a pen carrier connected to the pen and adapted to maintain the pen in proximity to the surface, means connected to the pen carrier and adapted to position the pen with respect to the surface in response to at least one variable, an ink reservoir coupled to the pen and adapted to contain non-aqueous ink having an initial softening point above ambient temperature and to pass the ink to the pen, heating means connected to the reservoir and adapted to supply the ink to the pen in a fluidized condition, whereby the ink can be readily deposited as a fluid on the surface and can be readily solidified on the surface to form a permanent trace corresponding to movements of the pen carrier relative to the recording medium in response to the variable, the improvement which comprises a dimensionally stable flexible, moisture resistant recording surface for said recording medium; at least said recording surface of said recording medium comprising normally solid, thermally fluidizable material compatible with said ink, having an initial softening point at least about that of said ink, and selected from the group consisting of synthetic thermoplastic resin, wax and mixtures thereof, whereby improved dimensional stability of a trace is provided.

2. The improvement in accordance with claim 1 wherein said recording surface of said recording medium is essentially moisture proof and wherein said ink comprises a base material selected from the group consisting of synthetic thermoplastic resin, wax and mixtures thereof.

3. The improvement in accordance with claim 1 wherein said recording surface of said recording medium comprises wax.

4. The improvement in accordance with claim 3 wherein said wax comprises chlorinated hydrocarbon wax.

5. The improvement in accordance with claim 1 wherein said recording surface of said recording medium comprises synthetic thermoplastic resin.

6. The improvement in accordance with claim 5 wherein said resin comprises polyethylene.

7. The improvement in accordance with claim 6 wherein said recording surface also includes chlorinated hydrocarbon wax.

8. The improvement in accordance with claim 5 wherein said resin comprises polyethylene terephthalate.

9. The improvement in accordance with claim 5 wherein the remainder of said recording medium is substantially identical in composition with that of said recording surface.

10. The improvement in accordance with claim 2 wherein said base material of said ink is substantially identical with said surface of said recording medium.

11. The improvement in accordance with claim 2 wherein said base material comprises chlorinated hydrocarbon wax.

12. The improvement in accordance with claim 2 wherein said base material comprises synthetic thermoplastic resin.

13. The improvement in accordance with claim 12 wherein said resin comprises polyethylene.

14. The improvement in accordance with claim 11 wherein said surface of said recording medium comprises chlorinated hydrocarbon wax.

15. In combination, a heat fluidized, non-aqueous ink having an initial softening point above ambient temperature and a dimensionally stable graphical recording medium comprising a sheet of extended surface area having a substrate and a moisture-resistant graphical recording surface integral with said substrate, said sheet bearing graphical recording indicia adjacent said surface and defining means adapted to releasably secure said sheet to support means in a graphical recording system, said surface being suitable for tracing thereon and compatible with said ink and comprising a single layer of normally solid, thermally fluidizable material having an initial softening point of at least about 150° F. and which is melted when contacted by the heat fluidized non-aqueous ink and selected from the group consisting of synthetic thermoplastic resin, wax and mixtures thereof, whereby said surface has improved dimensional stability.

16. The combination in accordance with claim 15 wherein said means comprises a plurality of apertures spaced along opposite sides of said sheet.

17. The combination in accordance with claim 15 wherein said surface comprises chlorinated hydrocarbon wax.

18. The combination in accordance with claim 15 wherein said surface comprises synthetic thermoplastic resin.

19. The combination in accordance with claim 17 wherein said resin comprises polyethylene.

20. The combination in accordance with claim 18 wherein said substrate is substantially identical in composition with said surface.

21. The combination in accordance with claim 17 wherein said surface also contains microcrystalline wax.

References Cited

UNITED STATES PATENTS

| Number | Date | Name | Class |
|---|---|---|---|
| 2,486,259 | 10/1949 | Chavannes | 117—15 |
| 2,519,660 | 8/1950 | James | 117—36.7 |
| 2,721,821 | 10/1955 | Hoover | 117—3.2 |
| 2,726,147 | 12/1955 | Heichlinger | 117—15 |
| 2,767,103 | 10/1956 | Loukomsky | 117—15 |
| Re. 24,554 | 10/1958 | Clark et al. | 117—36.7 |
| 2,927,039 | 3/1960 | Vander Weel | 117—36.7 |
| 2,962,382 | 11/1960 | Ives | 117—36.7 |
| 3,194,677 | 7/1965 | Schwarz | 117—36.7 |
| 3,241,997 | 3/1966 | Shutzner | 117—36.7 |

RICHARD B. WILKINSON, *Primary Examiner.*

MICHAEL LORCH, *Assistant Examiner.*